(12) United States Patent
Fujisawa et al.

(10) Patent No.: US 8,625,668 B2
(45) Date of Patent: Jan. 7, 2014

(54) INFORMATION PROCESSING APPARATUS AND VIDEO DECODING METHOD OF INFORMATION PROCESSING APPARATUS

(75) Inventors: Tatsuro Fujisawa, Ome (JP); Yoshihiro Kikuchi, Ome (JP); Yuji Kawashima, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1717 days.

(21) Appl. No.: 11/644,188

(22) Filed: Dec. 22, 2006

(65) Prior Publication Data
US 2007/0160140 A1  Jul. 12, 2007

(30) Foreign Application Priority Data

Jan. 10, 2006 (JP) ................................. 2006-002973

(51) Int. Cl.
*H04N 11/02* (2006.01)
(52) U.S. Cl.
USPC ............. 375/240.13; 375/240.29; 375/240.26
(58) Field of Classification Search
USPC .................................. 348/333–400; 375/240
See application file for complete search history.

(56) References Cited

U.S. PATENT DOCUMENTS

| | | | | |
|---|---|---|---|---|
| 5,534,927 | A * | 7/1996 | Shishikui et al. | 348/400.1 |
| 5,796,438 | A * | 8/1998 | Hosono | 348/458 |
| 6,853,752 | B2 | 2/2005 | Tan et al. | |
| 6,907,079 | B2 | 6/2005 | Gomila et al. | |
| 7,028,203 | B2 * | 4/2006 | Nakai | 713/340 |
| 7,050,504 | B2 * | 5/2006 | Joch et al. | 375/240.26 |
| 7,126,989 | B2 * | 10/2006 | Hagai et al. | 375/240.13 |
| 7,161,982 | B2 * | 1/2007 | Kimoto | 375/240.13 |
| 7,542,092 | B2 * | 6/2009 | Ohsawa | 348/372 |

(Continued)

FOREIGN PATENT DOCUMENTS

| | | |
|---|---|---|
| CN | 1489867 | 4/2004 |
| CN | 1695378 | 11/2005 |

(Continued)

OTHER PUBLICATIONS

Dhondt et al., Flexible macroblock ordering as a content adaptation tool in H.264/AVC, Oct. 2005, SPIE vol. 6015 601506-1 col. 7; Ln.45. ( http://dircweb.kingston.ac.uk/papers/dissanayake2008_56267220/chaminda_7.pdf ).*

(Continued)

*Primary Examiner* — William C Vaughn, Jr.
*Assistant Examiner* — Luis M Perez
(74) *Attorney, Agent, or Firm* — Blakely, Sokoloff, Taylor & Zafman LLP

(57) ABSTRACT

According to one embodiment, information processing apparatus which decodes compressed and encoded video stream by software, selectively generates one of intra and inter prediction image on the basis of encoding mode of decoding object from video stream and decoded images thereof, generates a residual error decoded image on the basis of a quantization parameter of decoding object from video stream, generates decoded image by adding intra and inter prediction image selectively generated, and residual error decoded image, applies deblocking filter process for reducing block distortion onto decoded image, extracts at least one of information on a quantization parameter and information on encoding mode of decoding object from video stream, determines whether or not filter process is skipped on the basis of extracted information thereof, and selectively skips filter process on the basis of a result of determination, and selectively switches determination and processing of skip to be valid or invalid.

13 Claims, 16 Drawing Sheets

(56) References Cited

U.S. PATENT DOCUMENTS

| | | |
|---|---|---|
| 2001/0017977 A1 | 8/2001 | Umeda |
| 2001/0036320 A1 | 11/2001 | Tan et al. |
| 2002/0094028 A1* | 7/2002 | Kimoto .................... 375/240.14 |
| 2003/0206587 A1 | 11/2003 | Gomila |
| 2004/0158878 A1 | 8/2004 | Ratnakar et al. |
| 2004/0184549 A1* | 9/2004 | Webb ....................... 375/240.29 |
| 2006/0067406 A1* | 3/2006 | Kitada et al. ............. 375/240.16 |
| 2006/0203909 A1* | 9/2006 | Kitada et al. ............. 375/240.12 |
| 2007/0147515 A1 | 6/2007 | Kawashima et al. |
| 2007/0160129 A1* | 7/2007 | Fujisawa et al. .............. 375/240 |
| 2007/0160140 A1* | 7/2007 | Fujisawa et al. ......... 375/240.12 |
| 2007/0201555 A1* | 8/2007 | Kikuchi et al. .......... 375/240.13 |
| 2007/0223585 A1* | 9/2007 | Fujisawa et al. ......... 375/240.13 |
| 2008/0084491 A1* | 4/2008 | He et al. ................... 348/333.13 |
| 2008/0137753 A1 | 6/2008 | He |

FOREIGN PATENT DOCUMENTS

| | | |
|---|---|---|
| EP | 1453319 | 9/2004 |
| JP | 5122681 | 5/1993 |
| JP | 2001-275110 | 10/2001 |
| JP | 2003179921 | 6/2003 |
| JP | 2003-304538 | 10/2003 |
| JP | 2004180248 | 6/2004 |
| JP | 2004-242308 | 8/2004 |
| JP | 2005033724 | 2/2005 |
| WO | 03050758 | 6/2003 |

OTHER PUBLICATIONS

ISO/IEC 14496-10:2003, "Information Technology, Coding of Audio-Visual Objects—Part 10: Advanced Video Coding".
H.264/AVC Textbook (Impress Communications Corporation.
Japanese Patent Application No. 2006-002973, Notice of Reasons for Rejection, mailed Jun. 1, 2010, (English Translation).
First Office Action with English Translation in a Corresponding Chinese Application, No. 2006100636262 dated Nov. 21, 2008.
Japanese Patent Application No. 2005-375203, Notice of Reasons for Rejection, mailed Jun. 1, 2010 (English Translation).
U.S. Appl. No. 11/638,856, Non-Final Office Action, mailed Jul. 25, 2011.
ITU-T Recommendation H. 264(2003), "Advanced Video Coding for Generic Audiovisual Services", Mar. 2005, pp. 181-196.

* cited by examiner

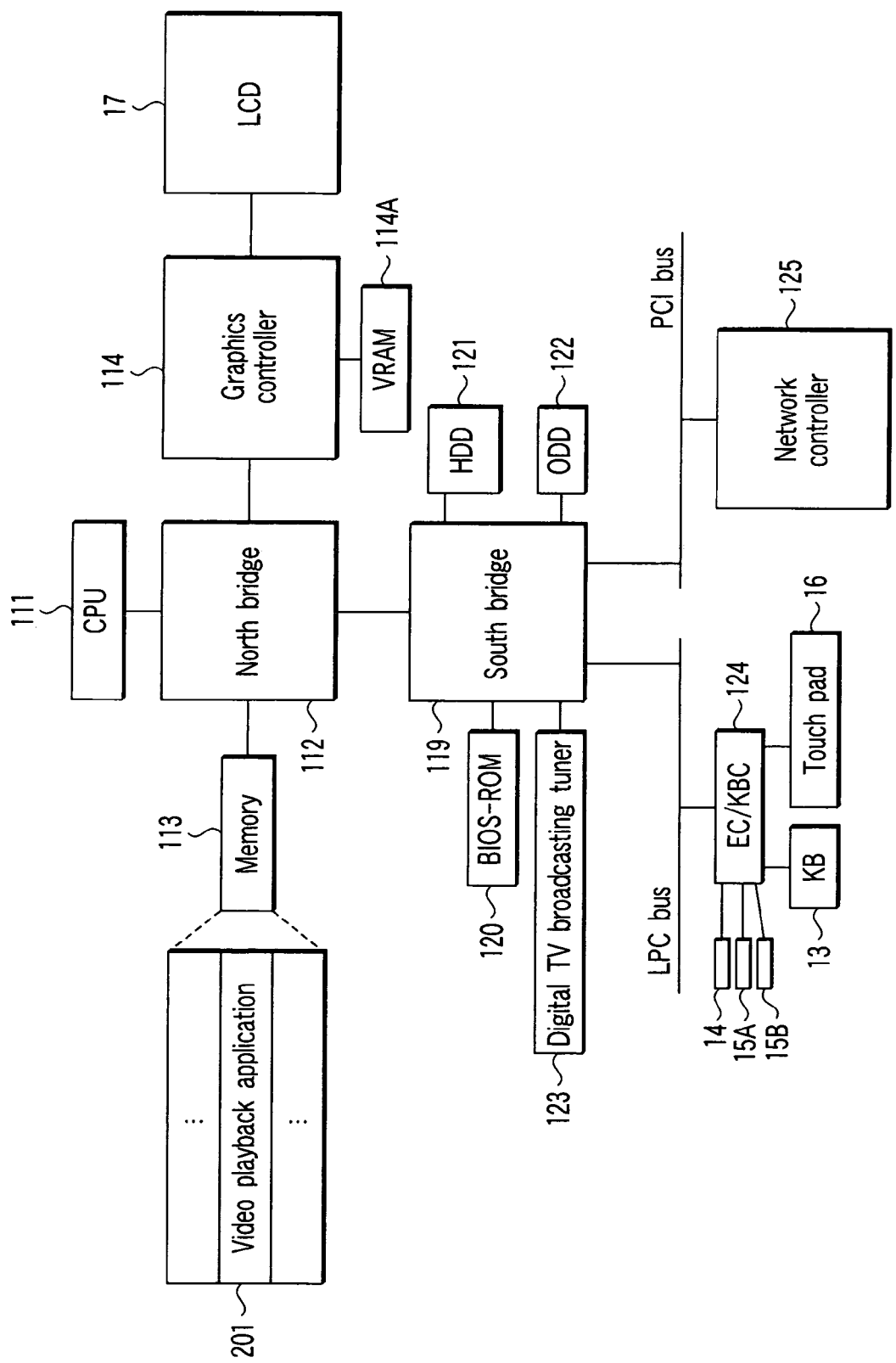
F I G. 2

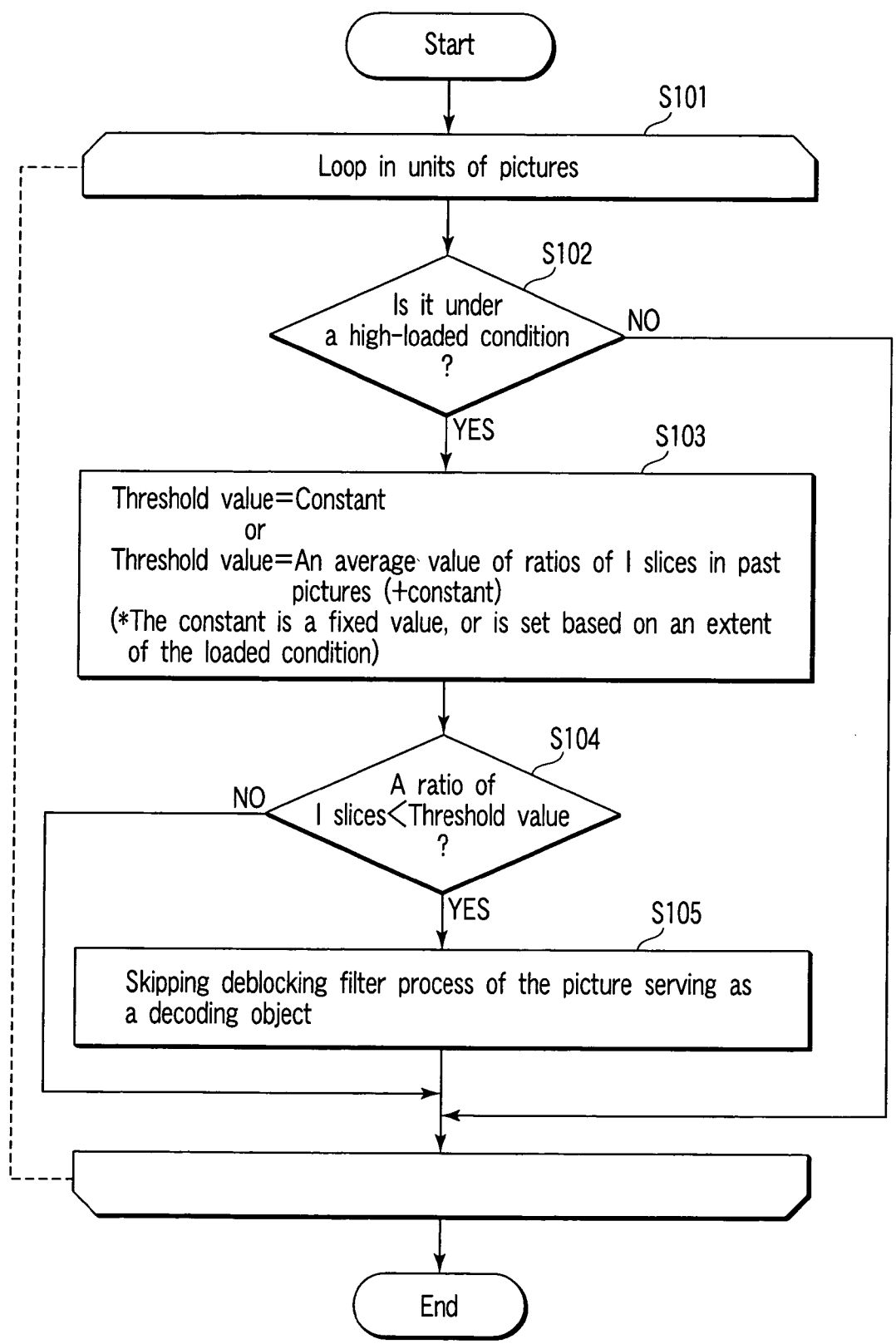
F I G. 15

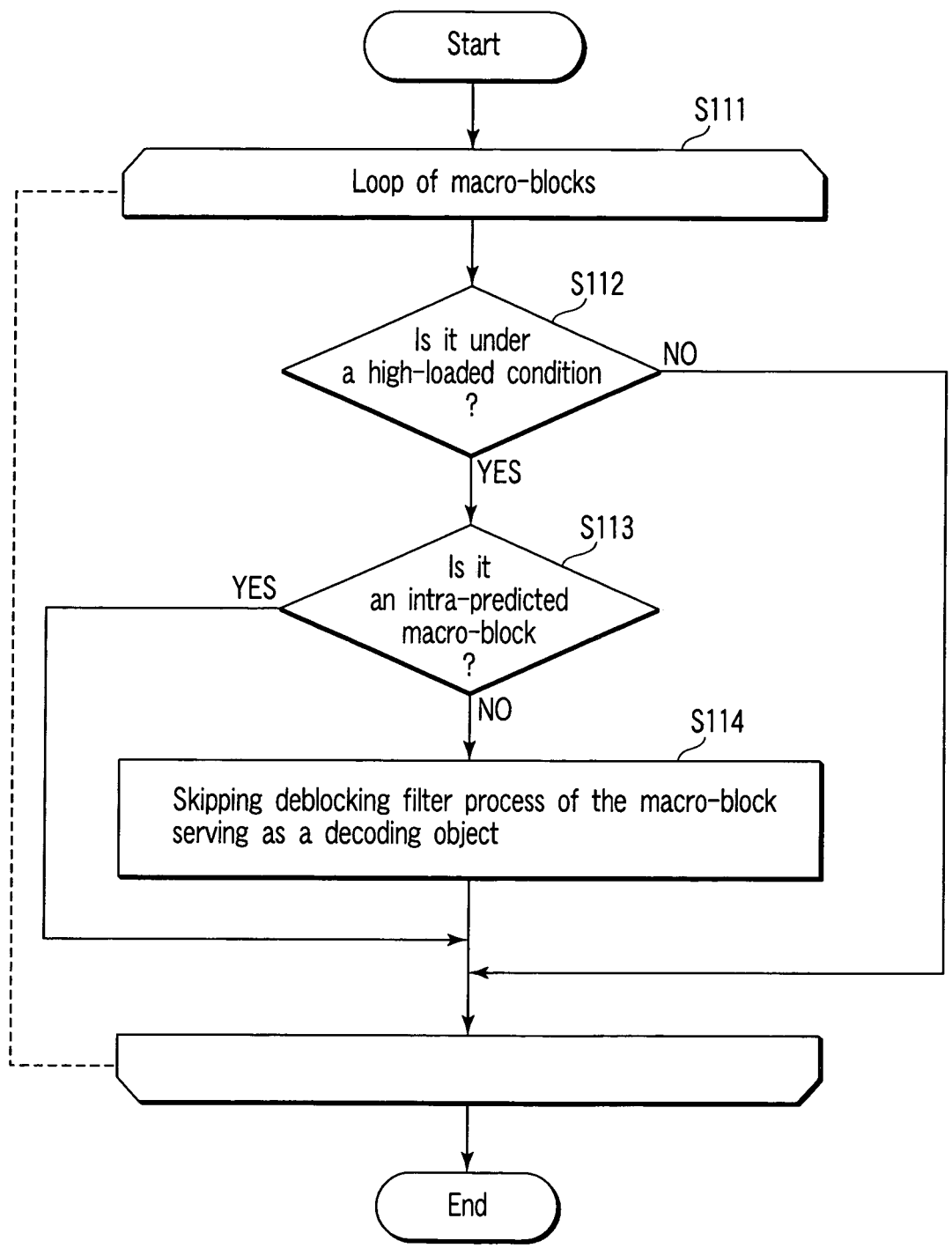
F I G. 16

INFORMATION PROCESSING APPARATUS AND VIDEO DECODING METHOD OF INFORMATION PROCESSING APPARATUS

CROSS-REFERENCE TO RELATED APPLICATIONS

This application is based upon and claims the benefit of priority from Japanese Patent Application No. 2006-002973, filed Jan. 10, 2006, the entire contents of which are incorporated herein by reference.

BACKGROUND

1. Field

One embodiment of the invention relates to an information processing apparatus in which video decoding processing for decoding a compressed and encoded video stream is achieved by software, and a video decoding method thereof.

2. Description of the Related Art

As standard technologies for encoding a video stream, H.261 and H.263 of the International Telecommunication Union Telecommunication Standardization Sector (ITU-T), Moving Picture Experts Group (MPEG)-1, MPEG-2, and MPEG-4 of the International Organization for Standardization (ISO), and the like, have been developed. As a next-generation video encoding method in which the technologies such as H.261 to H.263, MPEG-1 to MPEG-4, and the like have been succeeded, and further developed, there is the H.264 which has been standardized by the ISO and the ITU jointly. In the H.264, a deblocking filter for relieving a distortion generated at a block boundary is used as one of filters in loop, which enhances a picture quality improvement effect at a low bit rate particularly (refer to ITU-T Recommendation H.264 (2003), "Advanced Video Coding for generic audiovisual services"|ISO/IEC 14496-10: 2003, "Information technology, Coding of audio-visual objects—Part 10: Advanced video coding", and H.264/AVC textbook (Impress Communications Corporation)).

On the other hand, personal computers having the same AV functions as those of audio-video (AV) equipment such as digital versatile disc (DVD) players and TV devices have been developed. In such a personal computer, a software decoder which decodes a compressed and encoded video stream by software is used. By the use of a software decoder, it is possible to decode a compressed and encoded video stream by a processor (CPU) without dedicated hardware being provided thereto.

In an information processing apparatus such as the above-described personal computer, assume that video decoding processing according to standardization specifications based on the H.264 is achieved by software. In this case, a proportion of the throughput of the deblocking filter accounting the entire decoding processing is high. For this reason, real-time decoding processing is made unable to be in time when a load on an entire system is high, and there is possibility that defects are brought about in which frames are dropped, movement of an object is made extremely slow, and the like. In particular, in a battery-driven information processing apparatus, such as a notebook-type personal computer, an electric power consumption is made higher when a load is made larger in a battery-driving mode, which makes a driving time extremely short.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 2 is a block diagram showing a system configuration example of the computer of FIG. 1;

FIG. 15 is a flowchart showing a processing example in a case according to pattern 2 of the first method in skip determination by information on an encoding mode, as an eighth embodiment of the skip determining method of the deblocking filter skip determining unit in FIG. 4;

FIG. 16 is a flowchart showing a processing example in a case according to pattern 1 of a second method in skip determination by information on an encoding mode, as a ninth embodiment of the skip determining method of the deblocking filter skip determining unit in FIG. 4.

DETAILED DESCRIPTION

Various embodiments according to the invention will be described hereinafter with reference to the accompanying drawings. In general, according to one embodiment of the invention, an information processing apparatus which decodes a compressed and encoded video stream by software, comprising: means for selectively generating one of an intra prediction image and an inter prediction image on the basis of an encoding mode of a decoding object from the video stream and decoded images thereof; means for generating a residual error decoded image on the basis of a quantization parameter of a decoding object from the video stream; means for generating a decoded image by adding the intra prediction image and the inter prediction image selectively generated by the prediction decoding means, and the residual error decoded image generated by the residual error decoding means; means for applying deblocking filter process for reducing a block distortion onto the decoded image generated by the residual error adding means; means for extracting at least one of information on a quantization parameter and information on an encoding mode of the decoding object from the video stream, and for determining whether or not the filter process is skipped, on the basis of extracted information thereof; means for selectively skipping the filter process on the basis of a result of the determination of skip; and means for selectively switching the determination and processing of skip to be valid or invalid.

Hereinafter, embodiments of the present invention will be descried with reference to the drawings.

First, a configuration example of an information processing apparatus according to one embodiment of the present invention will be described with reference to FIGS. 1 and 2. The information processing apparatus is realized as, for example, a notebook type personal computer 10.

Figure 1:
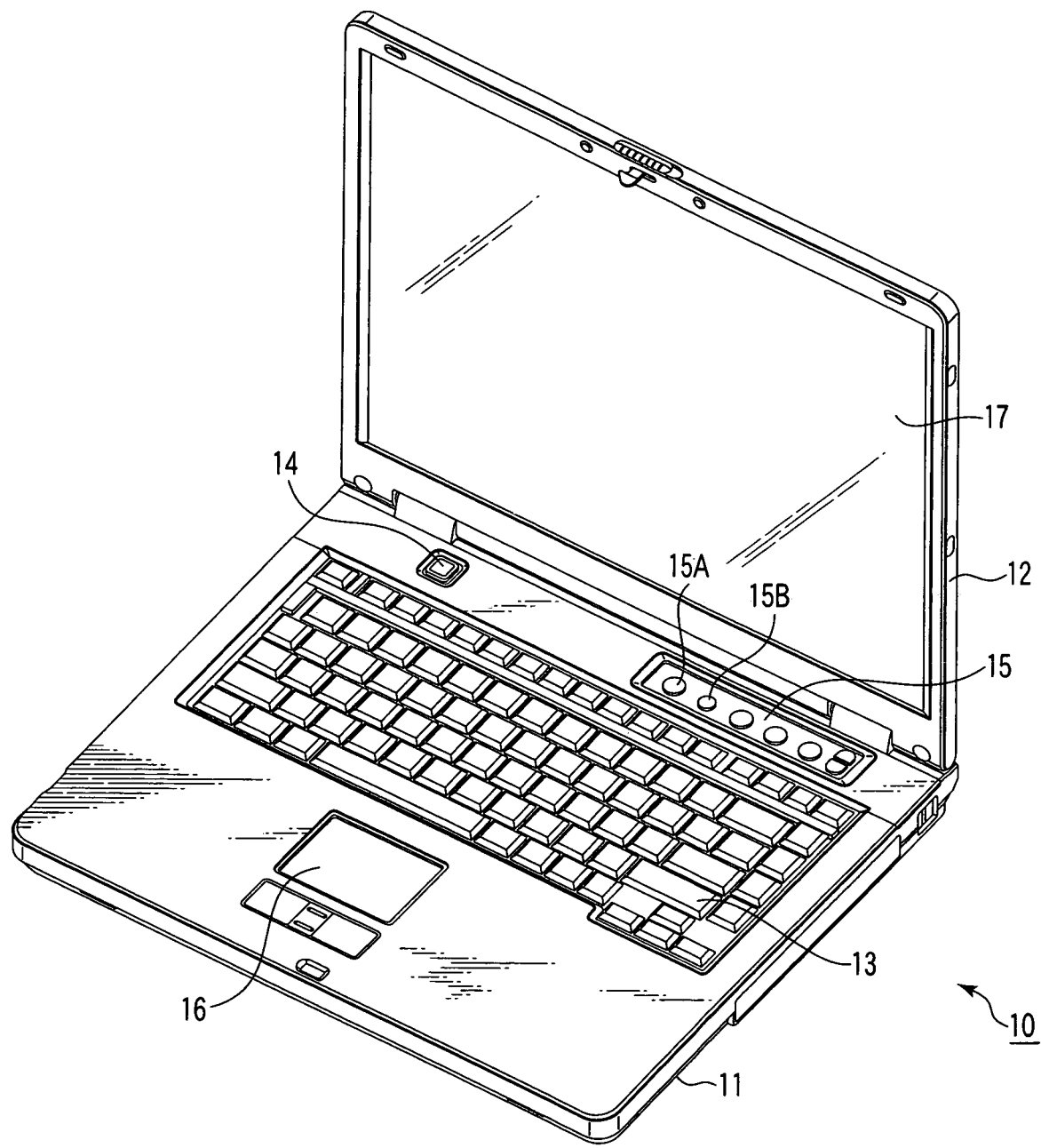
FIG. 1 is a perspective view showing an example of an outside of a computer according to one embodiment of the present invention.

FIG. 1 is a front view showing a state in which a display unit of the notebook type personal computer 10 is opened as seen from the front. The computer 10 is composed of a computer main body 11 and a display unit 12. A display device composed of a liquid crystal display (LCD) 17 is built into the display unit 12, and a display screen of the LCD 17 is positioned at substantially the center of the display unit 12.

The display unit 12 is attached so as to be freely rotatable between an open position and a closed position with respect to the computer main body 11. The computer main body 11 has a thin box form case. A keyboard 18, a power button 14 for turning the computer 10 power-on/off, an input operation panel 15, a touch pad 16, and the like are arranged on the upper surface of the computer main body 11.

The input operation panel 15 is an input device for inputting an event corresponding to a pushed button, and has a plurality of buttons for respectively starting a plurality of functions. A TV starting button 15A and a digital versatile disc (DVD) starting button 15B as well are included in the group of these buttons. The TV starting button 15A is a button for starting a TV function for carrying out playback and recording of broadcast program data such as a digital TV broadcast program. When the TV starting button 15A is pressed down by a user, an application program for executing the TV function is automatically started. The DVD starting button 15B is a button for playing back video contents recorded on a DVD. When the DVD starting button 15B is pressed down by a user, an application program for playing back video contents is automatically started.

Next, a system configuration example of the computer 10 will be described with reference to FIG. 2.

As shown in FIG. 2, the computer 10 has a CPU 111, a north bridge 112, a main memory 113, a graphics controller 114, a south bridge 119, a BIOS-ROM 120, a hard disk drive (HDD) 121, an optical disk drive (ODD) 122, a digital TV broadcasting tuner 123, an embedded controller/keyboard controller IC (EC/KBC) 124, a network controller 125, and the like.

The CPU 111 is a processor provided for controlling operations of the computer 10, and executes various application programs such as an operating system (OS) and a video playback application program 201 which are loaded from the hard disk drive (HDD) 121 to the main memory 113.

The video playback application program 201 is software for decoding and playing back compressed and encoded video data. The video playback application program 201 is a software decoder according to the H.264/AVC standard. The video playback application program 201 has a function for decoding a video stream compressed and encoded in an encoding method defined by the H.264/AVC standard (for example, a digital TV broadcast program received by the digital TV broadcasting tuner 123, vide contents according to the high definition (HD) standard read from the optical disk drive (ODD) 122, and the like).

Figure 3:
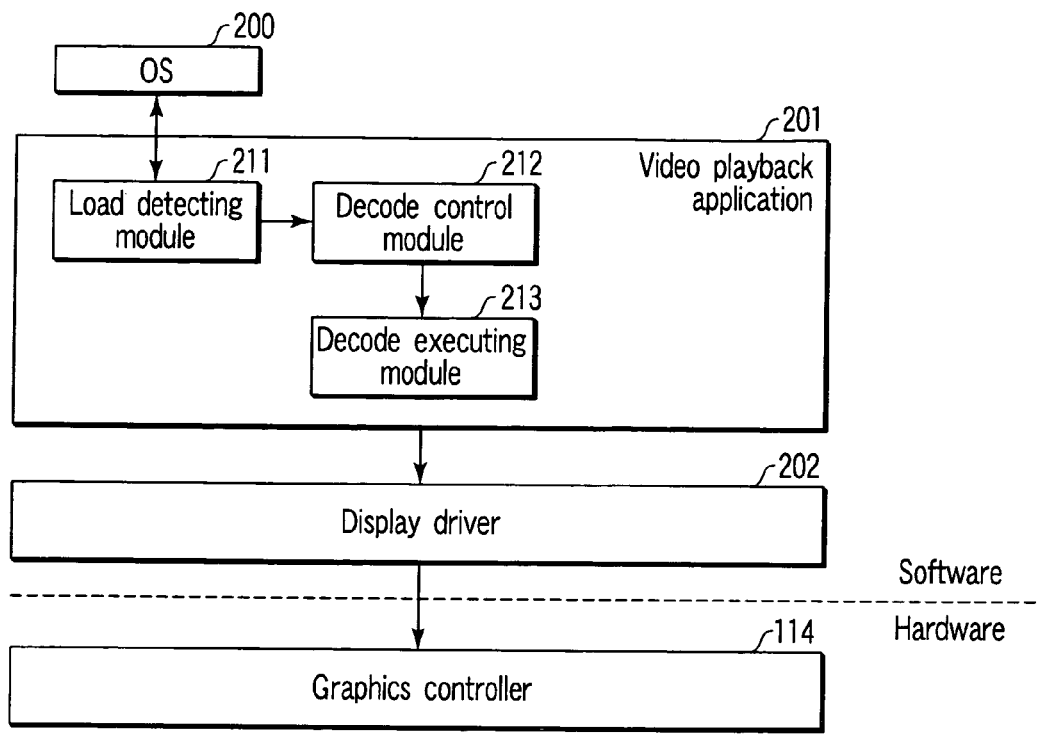
FIG. 3 is a block diagram showing a functional configuration example of a video playback application program for use in the computer of FIG. 1.

As shown in FIG. 3, the video playback application program 201 has a load detecting module 211, a decode control module 212, and a decode executing module 213.

The decode executing module 213 is a decoder for executing decode processing defined by the H.264/AVC standard. The load detecting module 211 is a module for detecting a load on the computer 10. The load detecting module 211 detects a current loading dose of the computer 10 by inquiring of an operating system (OS) 200 about a current load of the computer 10. A loading dose of the computer 10 is determined on the basis of, for example, a usage rate of the CPU 111.

Further, a loading dose of the computer 10 can be determined on the basis of a combination of a usage rate of the CPU 111 and a usage rate of the memory 113. Usually, a memory of a certain definite size or more is required for executing a software decoder smoothly. When a usage rate of the memory in the system is made higher, decoding performance of the software decoder is deteriorated due to paging of the OS. Therefore, by detecting a loading dose, namely the amount of load of the computer 10, on the basis of a combination of a usage rate of the CPU 111 and a usage rate of the memory 113, it is possible to precisely determine whether or not a current loading dose of the computer 10 is a loading dose which poses a problem for executing the software decoder (in a high-loaded state).

The decode control module 212 controls contents of decode processing executed by the decode executing module 213 in accordance with a load on the computer 10 detected by the load detecting module 211.

Specifically, when a loading dose of the computer 10 is less than or equal to a reference value determined in advance, the decode control module 212 controls contents of decode processing to be executed by the decode executing module 213 such that the decode processing defined by the H.264/AVC standard is executed by the CPU 111. On the other hand, when a loading dose of the computer 10 is larger than the reference value (in a high-loaded state), the decode control module 212 controls contents of decode processing to be executed by the decode executing module 213 such that a part of the decode processing defined by the H.264/AVC standard is replaced with SKIPPED or simplified processing.

Video data decoded by the video playback application program 201 are sequentially written into a video memory 114A of the graphics controller 114 via a display driver 202. Consequently, the decoded video data are displayed on the LCD 17. The display driver 202 is software for controlling the graphics controller 114.

Further, the CPU 111 executes a system BIOS (Basic Input Output System) stored in the BIOS-ROM 120 as well. The system BIOS is a program for controlling hardware.

The north bridge 112 is a bridge device for connecting a local bus of the CPU 111 and the south bridge 119. A memory controller for access-controlling the main memory 113 as well is built in the north bridge 112. Further, the north bridge 112 further has a function of executing communication with the graphics controller 114 via an accelerated graphics port (AGP) bus or the like.

The graphics controller 114 is a display controller for controlling the LCD 17 used as a display monitor of the computer 10. The graphics controller 114 generates a display signal to be transmitted to the LCD 17 from image data written in the video memory (VRAM) 114A.

The south bridge 119 controls respective devices on a low pin count (LPC) bus, and respective devices on a peripheral component interconnect (PCI) bus. Further, the south bridge 119 has an integrated drive electronics (IDE) controller for controlling the HDD 121 and the ODD 122 built-in. Moreover, the south bridge 119 has a function for controlling the digital TV broadcasting tuner 123 and a function for access-controlling the BIOS-ROM 120 as well.

The HDD 121 is a storage device which stores various software and data. The optical disk drive (ODD) 123 is a drive unit for driving a storage medium such as a DVD on which video contents are stored. The digital TV broadcasting tuner 123 is a receiving apparatus for receiving broadcast program data such as a digital TV broadcast program from the outside.

The embedded controller/keyboard controller IC (EC/KBC) 124 is a one-chip microcomputer in which an embedded controller for managing electric power and a keyboard controller for controlling the keyboard (KB) 13 and the touch pad 16 are integrated. The embedded controller/keyboard controller IC (EC/KBC) 124 has a function of turning the computer 10 power-on/power-off in accordance with an operation of the power button 14 by a user. Moreover, the embedded controller/keyboard controller IC (EC/KBC) 124 can turn the computer 10 power-on in accordance with an operation of the TV starting button 15A or the DVD starting button 15B by a user. The network controller 125 is a communication device which executes communication with an external network such as, for example, the Internet.

Next, a functional configuration of the software decoder achieved by the video playback application program will be described with reference to FIG. 4.

Figure 4:
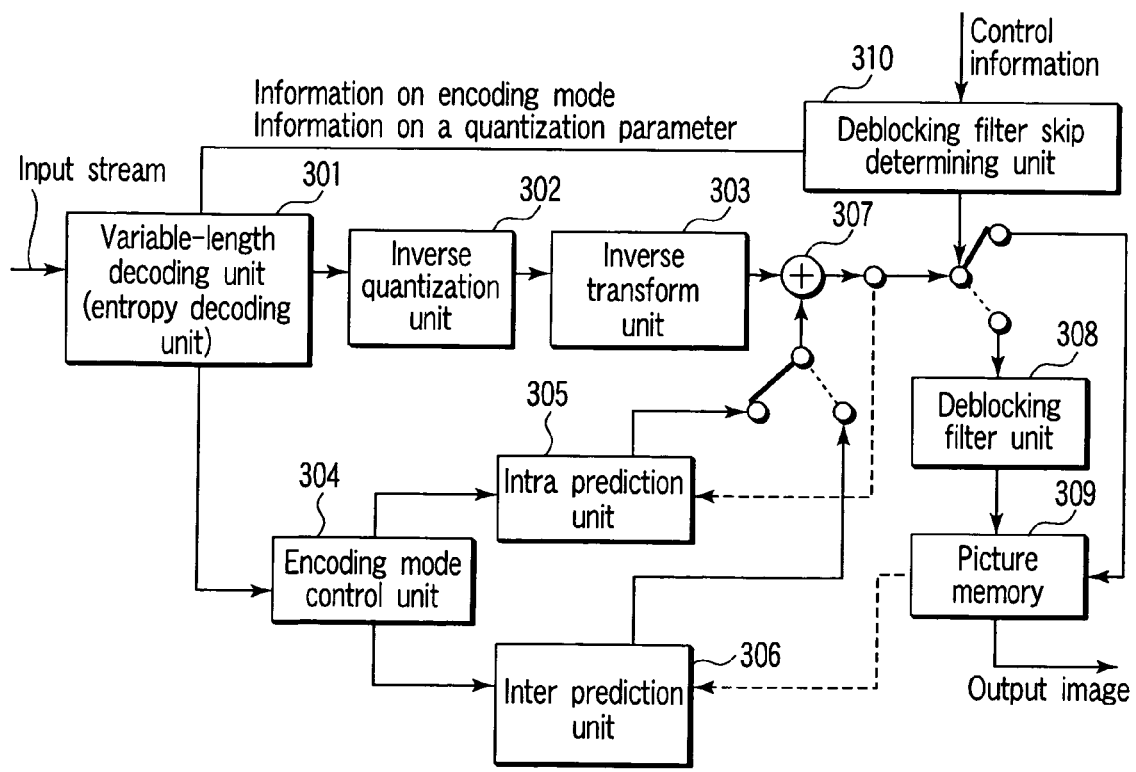
FIG. 4 is a block diagram showing a configuration example in a case where the invention is applied to video decoding processing according to standardization specifications based on the H.264 as a software decoder achieved by the video playback application program of FIG. 3.

FIG. 4 is a block diagram showing a structural example when the present invention is applied to a software decoder in accordance with standardization specifications based on the H.264, as one embodiment of a video decoding apparatus relating to the present invention. In FIG. 1, an input stream is a video stream which has been compressed and encoded in accordance with the H.264 standard, and is transmitted to a variable-length decoding unit (called an entropy decoding unit as well) 301. The variable-length decoding unit 301 encodes an input stream so as to be a varying length, and generates syntax. An inverse quantization unit 302 and an inverse transform unit 303 generate a residual image from a result of encoding of a video encoded stream based on the generated syntax.

An encoding mode control unit 304 discriminates an encoding mode based on the input stream from the variable-length decoding unit 301, and selectively controls to drive a intra prediction unit 305 and a inter prediction unit 306 based on a result of discrimination. The intra prediction unit 305 and the inter prediction unit 306 respectively generate predicted images in a screen and between screens in accordance with an encoding mode designated by the encoding mode control unit 304. Generated predicted images are selectively transmitted to a residual adding unit 307. The residual adding unit 307 adds a predicted image from the intra prediction unit 305 or the inter prediction unit 306, and a residual image from the inverse transform unit 303 to generate a decoded image. The generated decoded image is provided as a reference in the intra prediction unit 305.

Further, a deblocking filter skip determining unit 310 extracts information on a quantization parameter such as a quantization step or the like, and information on an encoding mode from the variable-length decoding unit 301, and determines whether or not deblocking filter process is carried out onto the generated decoded image generated in the residual adding unit 307. The determining method will be described later. Here, in a case in which deblocking filter process is carried out, the decoded image is inputted to a deblocking filter unit 308, and a reconstructed image is prepared by carrying out filter process, and is stored in a picture memory 309. When deblocking filter process is not carried out, the decoded image is directly stored as a reconstructed image in the picture memory 309. The reconstructed image stored in the picture memory 309 is outputted as an output image and provided as a reference in the inter prediction unit 306.

There is a feature of the present invention in the point that, when a throughput is reduced by skipping a deblocking filter having high processing load, in consideration of deterioration in picture quality, an attempt is made to reduce a throughput while preventing deterioration in picture quality as much as possible by skipping only portions predicted with less deterioration in picture quality. To describe concretely, in order to prevent deterioration in picture quality, (1) Only portions on which a filter effect is weak are skipped (portions on which a filter effect is strong are not skipped), and (2) Portions from which errors run through the following portions are not skipped (only independent portions are skipped) are principles.

In skip determination of a deblocking filter, information on a quantization parameter and information on an encoding mode obtained from an input stream by the variable-length decoding unit 101 are utilized. In a deblocking filter, there are features that the larger the quantization parameter is, the easier the filtering is, and the larger the information on an encoding mode (Bs value) is, the easier the filtering is. In the present invention, skip of filter process is effectively carried out by utilizing these features.

Here, a quantization parameter is a degree of quantizing an orthogonal transformation coefficient (DCT coefficient) in a macro-block, and when this value is too large, a noise called a block-noise is generated. In accordance with ease of generating of a block-noise, i.e., as a quantization parameter is made larger, a filter effect is made stronger. As quantization parameters in the H.264 standard, a quantization parameter of a slice and a quantization parameter of a macro-block are stipulated.

(Skip Determination by Information on a Quantization Parameter)

When skip determination is carried out by information on a quantization parameter, a central value of quantization parameters and a predetermined threshold value are compared. The deblocking filter is skipped when the following relation is satisfied:

the central value of quantization parameters<the threshold value.

As the central value of quantization parameters, there are the following five patterns.

Pattern 1: A skip range of filter process is made to be in units of pictures, and a central value is regarded as an average value of quantization parameters of slices belonging to a reference picture.

Pattern 2: A skip range of filter process is made to be in units of pictures, and a central value is regarded as an average value of quantization parameters of macro-blocks belonging to a reference picture.

Pattern 3: A skip range of filter process is made to be in units of slices, and a central value is regarded as a quantization parameter of a reference slice.

Pattern 4: A skip range of filter process is made to be in units of slices, and a central value is regarded as an average value of quantization parameters of macro-blocks belonging to a reference slice.

Pattern 5: A skip range of filter process is made to be in units of macro-blocks, and a central value is regarded as a quantization parameter of a reference macro-block.

As the threshold value, three are the following three types.

(1) A constant (which is a fixed value, or is set based on an extent of a loaded condition)

(2) An average value of central values in past (decoded) pictures or slices (3) A value in which an offset value (a constant) is added to an average value of central values in past (decoded) pictures or slices (Skip Determination by Information on an Encoding Mode)

Next, first to fourth methods in a case in which skip determination is carried out by information on an encoding mode will be described.

In the first method by an encoding mode, when decoding objects are slices in I picture (hereinafter, I slices), deblocking filter process is not skipped. This is because a filter effect is strong in an intra-predicted macro-block, and deterioration in picture quality due to skip is made large. In this method, there are the following two patterns.

Pattern 1: A skip range of filter process is made to be in units of slices, and when a reference slice is an I slice, filter process is not skipped.

Pattern 2: A skip range of filter process is made to be in units of pictures, and when a number or a ratio of I slices belonging to a reference picture is larger than a threshold value, filter process is not skipped. As a threshold value, a constant (which is a fixed value, or is set based on an extent of a loaded condition), or an average value of a number (or a ratio) of I slices in past pictures (or a value in which an offset value (a constant) is added to an average value) is utilized.

In the second method by an encoding mode, when decoding objects are intra-predicted macro-blocks, deblocking filter process is not skipped. As described above, this is because a filter effect in an intra-predicted macro-block is strong, and deterioration in picture quality due to skip is made large. In this method, there are the following three patterns.

Pattern 1: A skip range of filter process is made to be in units of macro-blocks, and when a reference macro-block is an intra-predicted macro-block, filter process is not skipped.

Pattern 2: A skip range of filter process is made to be in units of slices, and when a number of intra-predicted macro-blocks belonging to a reference slice is larger than a threshold value, filter process is not skipped. As a threshold value, a constant (which is a fixed value, or is set based on an extent of a loaded condition), or an average value of a number (or a ratio) of intra-predicted macro-blocks belonging to past (decoded) slices (or a value in which an offset value (a constant) is added to an average value) is utilized.

Pattern 3: A skip range of filter process is made to be in units of pictures, and when a number of intra-predicted macro-blocks belonging to a reference picture is larger than a threshold value, filter process is not skipped. As a threshold value, a constant (which is a fixed value, or is set based on an extent of a loaded condition), or an average value of a number (or a ratio) of intra-predicted macro-blocks belonging to past (decoded) pictures (or a value in which an offset value (a constant) is added to an average value) is utilized.

In the third method by an encoding mode, when decoding objects are slices in B picture (hereinafter, B slices), deblocking filter process is skipped. The reason for this is that, because pictures are not referred in B slices, deterioration in picture quality does not extend to the following pictures, and because a throughput is high, an effect of skip is large. In this method, there are the following two patterns.

Pattern 1: A skip range of filter process is made to be in units of slices, and when a reference slice is a B slice, filter process is skipped.

Pattern 2: A skip range of filter process is made to be in units of pictures, and when a number of B slices belonging to a reference picture is larger than a threshold value, filter process is skipped. As a threshold value, a constant (which is a fixed value, or is set based on an extent of a loaded condition), or an average value of a number (or a ratio) of B slices belonging to past (encoded) pictures (or a value in which an offset value (a constant) is added to an average value) is utilized.

In the fourth method by an encoding mode, when decoding objects are bi-directional predicted macro-blocks of a B picture (hereinafter, bi-directional predicted (B) macro-blocks), because pictures are not referred, and a throughput is large, filter process is skipped. In this method, there are the following three patterns.

Pattern 1: A skip range of filter process is made to be in units of macro-blocks, and when a reference macro-block is a bi-directional predicted (B) macro-block, filter process is skipped.

Pattern 2: A skip range of filter process is made to be in units of slices, and when a number of bi-directional predicted (B) macro-blocks belonging to a reference slice is larger than a threshold value, filter process is skipped. As a threshold value, a constant (which is a fixed value, or is set based on an extent of a loaded condition), or an average value of a number (or a ratio) of bi-directional predicted (B) macro-blocks belonging to past (decoded) slices (or a value in which an offset value (a constant) is added to an average value) is utilized.

Pattern 3: A skip range of filter process is made to be in units of pictures, and when a number of bi-directional predicted (B) macro-blocks belonging to a reference picture is larger than a threshold value, filter process is skipped. As a threshold value, a constant (which is a fixed value, or is set based on an extent of a loaded condition), or an average value of a number (or a ratio) of bi-directional predicted (B) macro-blocks belonging to past (decoded) pictures (or a value in which an offset value (a constant) is added to an average value) is utilized.

In accordance with the above-described processing for skip determination of deblocking filter process, it is possible to reduce a throughput while preventing picture quality from being largely deteriorated. Moreover, because there are a very small number of changes in a conventional structure, structure of the present invention can be easily built in.

In the above-described video decoding methods, as compared with the conventional method, an amount of throughput in the processing for determination carried out in the deblocking filter skip determining unit 310 is increased. However, because this is considered to be an extremely small amount for the entire deblocking filter process which can be skipped, it will be possible to largely reduce a throughput as a whole.

Figure 5:
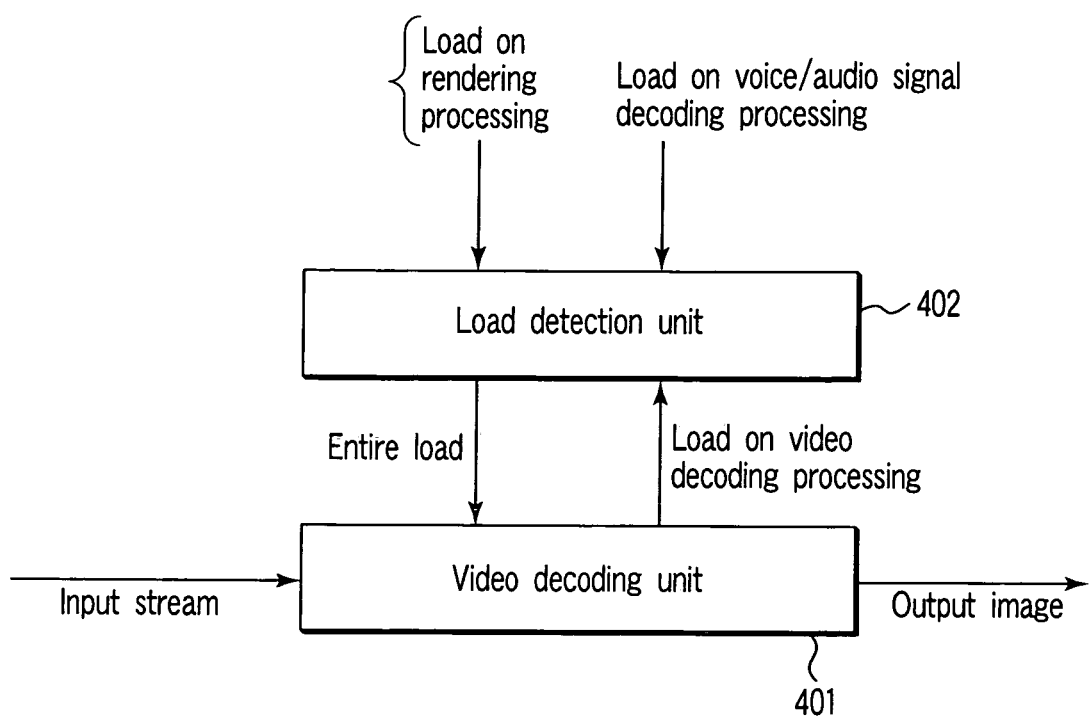
FIG. 5 is a block diagram showing a structural example of a content information processing system including the video decoding apparatus shown in FIG. 4 as a video decoding unit.

FIG. 5 shows a configuration example of the information processing apparatus including the software decoder shown in FIG. 4 as a video decoding unit 401. This information processing apparatus has a processing load detection unit 402. The processing load detection unit 402 acquires, not only information on processing load in video decoding processing from the video decoding unit 401, but also information on the other processing load of the system in decoding processing for voice/audio signals, rendering processing, and the like; calculates an entire load on the basis of the input information on load; and notifies the video decoding unit 401 of the information on load. Further, in battery-driving, the processing load detection unit 402 receives, for example, notification of a remaining battery level. When a remaining battery level is less than an allowable remaining level, the processing load detection unit 402 causes the video decoding unit 401 to execute the control of skip of deblocking filter processing regardless of a situation of the processing load. Further, in AC power-driving, it is preferable that skip of deblocking filter process is automatically turned off, and an attempt is made to improve picture quality.

Figure 6:
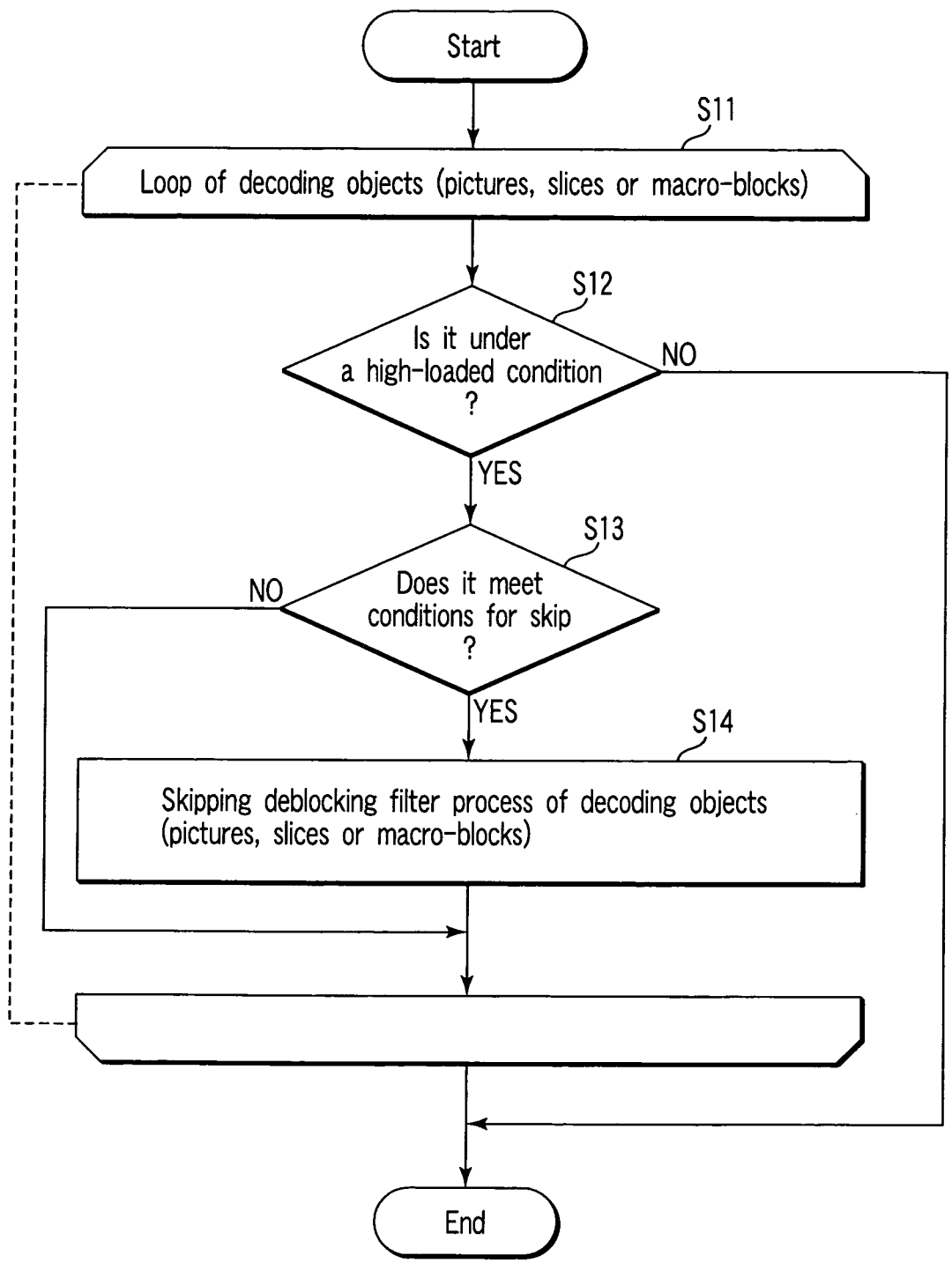
FIG. 6 is a flowchart showing a basic processing example of a deblocking filter skip determining unit in FIG. 4.
Figure 7:
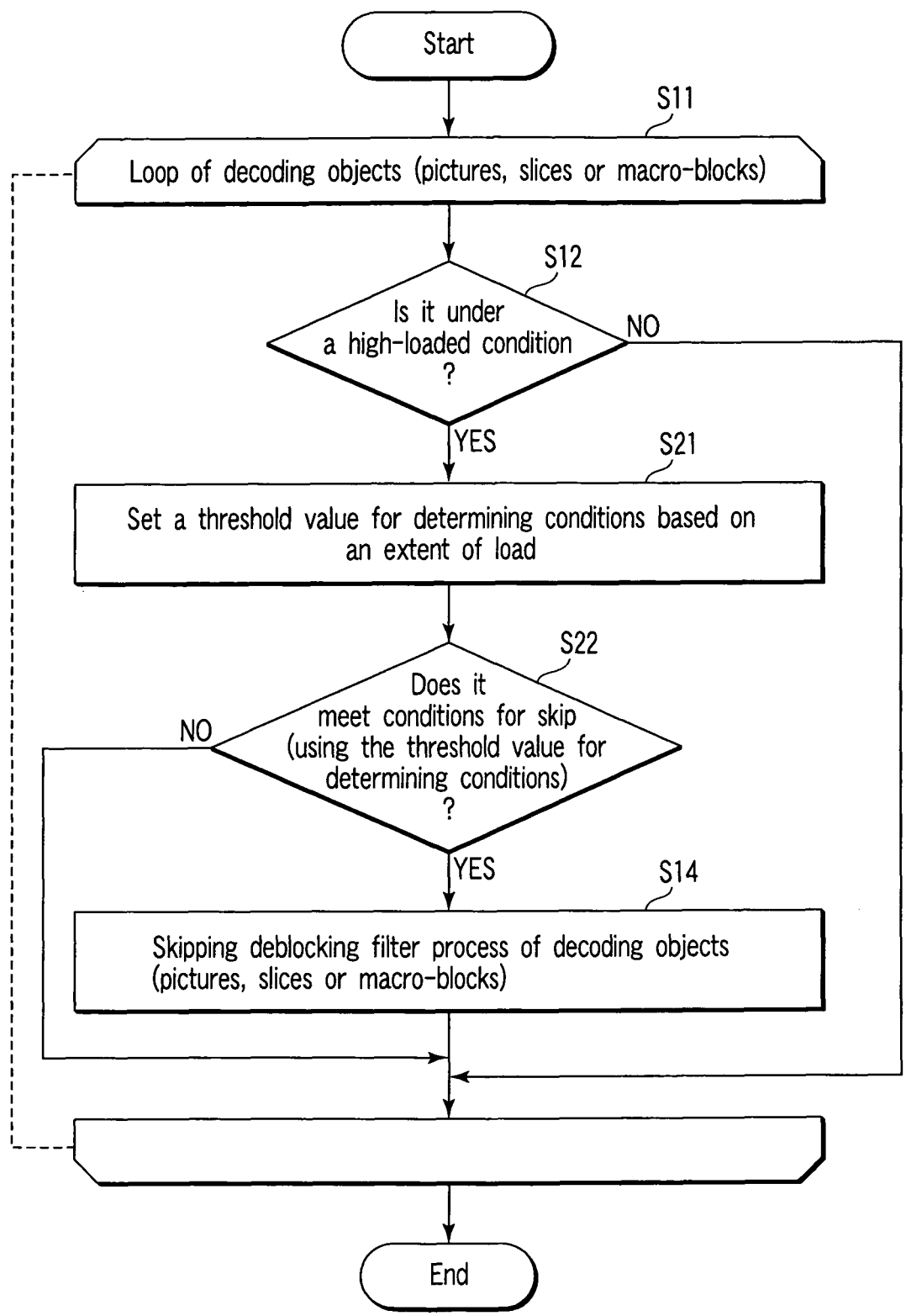
FIG. 7 is a flowchart showing another basic processing example of the deblocking filter skip determining unit in FIG. 4.

The information on load is inputted to the deblocking filter skip determining unit 310 in FIG. 4, in the video decoding unit 401. Basic processing examples of the determining unit 310 are shown in FIG. 6 and FIG. 7. Note that, in FIG. 7, steps which are the same as those in FIG. 6 are denoted by the same reference numerals.

In the processing example shown in FIG. 6, when a start of skip determination is instructed in decoding processing, a skip range of filter process is set to be a loop in units of pictures, slices, or macro-blocks (step S11), and it is determined whether or not the processing is under a high-loaded condition (step S12). When it is determined that the processing is under a high-loaded condition, it is determined whether or not the skip range meets the conditions for skip according to the aforementioned methods based on information on an encoding mode and a quantization parameter of an decoding object (step S13). When it meets the conditions, processing is skipped deblocking filter process of the decoding object (step S14). When it is determined that it does not meet the conditions for skip at step S13, the processing at step S14 is passed, and the routine proceeds to processing for the following decoding object. Further, when it is determined that the processing is not under a high-loaded condition at step S12, because it is possible to execute deblocking filter process in real time, the processing for skip determination is terminated, and deblocking filter process is executed.

In contrast thereto, in the processing example shown in FIG. 7, when it is determined that the processing is under a high-loaded condition at step S12 for determining a high-loaded condition, a threshold value for determining conditions is set based on an extent of load (step S21), and it is determined whether or not it meets the conditions for skip in the same way at the step S13 by using the threshold value (step S22).

Namely, in both of the procedures of the above-described two processing examples, by appropriately controlling filter process in accordance with a loaded condition for each decoding object, skip of deblocking filter process is not carried out when a load on an entire system is low or a system has a high processing capacity. Deblocking filter process is executed when decoding processing in real time is sufficiently possible. Therefore, it is possible to effectively skip filter process while preventing unnecessary deterioration in picture quality.

Hereinafter, some of methods for skip determination of the deblocking filter skip determining unit 310 will be described by sampling an embodiment for each condition for skip.

(First Embodiment)

Figure 8:
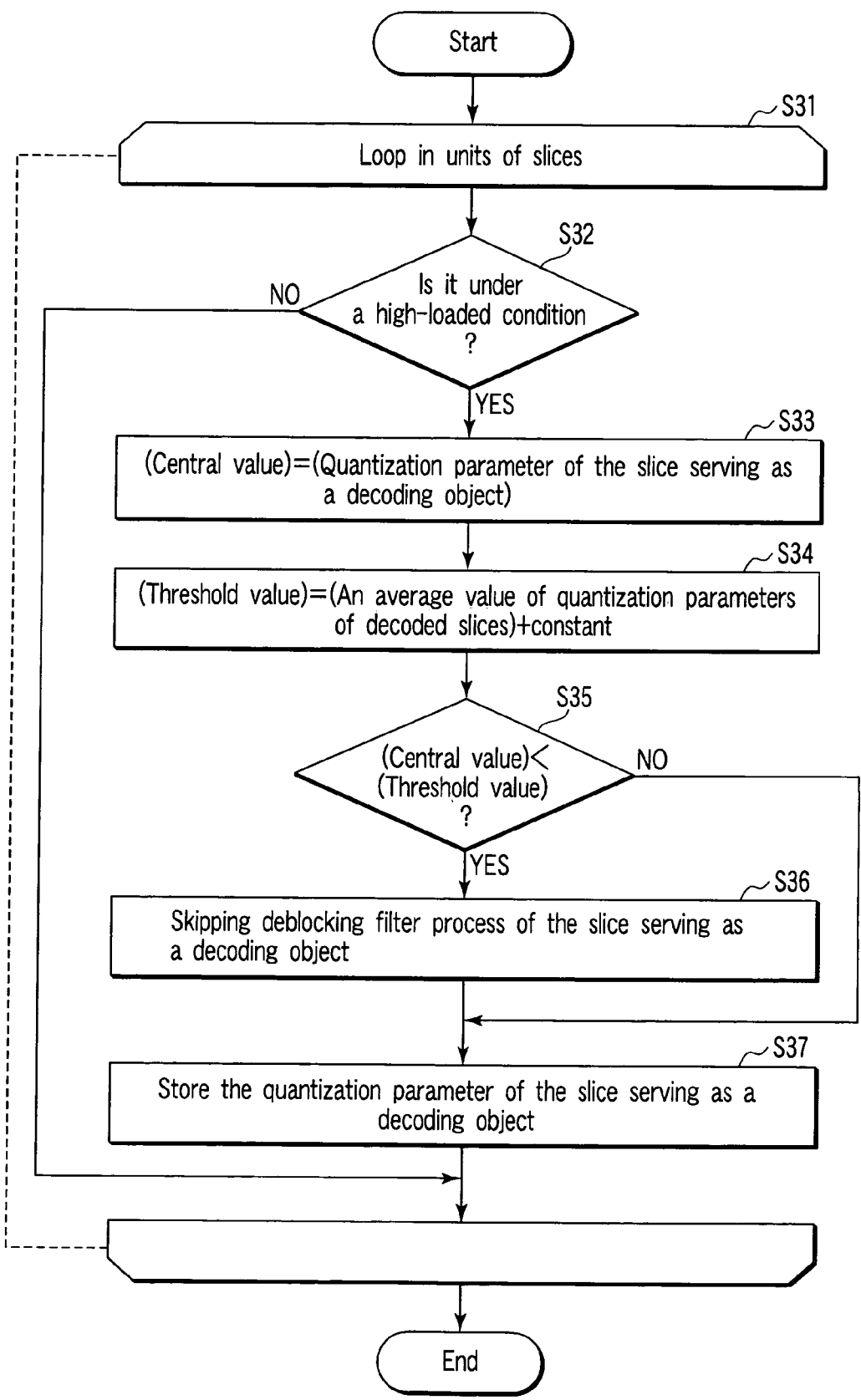
FIG. 8 is a flowchart showing a processing example in a case according to pattern 3 in skip determination by information on a quantization parameter, as a first embodiment of a skip determining method of the deblocking filter skip determining unit in FIG. 4.

FIG. 8 is a flowchart showing a processing example in a case of the pattern 3 in skip determination by information on a quantization parameter described above, as a first embodiment. In this embodiment, a skip range of filter process is set to be a loop in units of slices (step S31). Next, it is determined whether or not the processing is under a high-loaded condition (step S32), and when the processing is under a high-loaded condition, a quantization parameter of a slice serving as a decoding object is set as a central value (step S33), and (an average value of quantization parameters of decoded slices)+a constant (an offset value) is set as a threshold value (step S34), and it is determined whether or not the central value is less than the threshold value (step S35). When the central value is less than the threshold value, processing is skipped deblocking filter process of the slice serving as a decoding object (step S36), and a quantization parameter of the slice serving as a decoding object is stored, and the routine proceeds to skip determination for the following slice unit (step S37). When it is determined that the central value is not less than the threshold value at the step S35, the processing at step S36 is skipped. Further, when it is determined that the processing is not under a high-loaded condition at the step S32, processing is carried out such that deblocking filter process is executed onto the slice serving as a decoding object.

(Second Embodiment)

Figure 9:
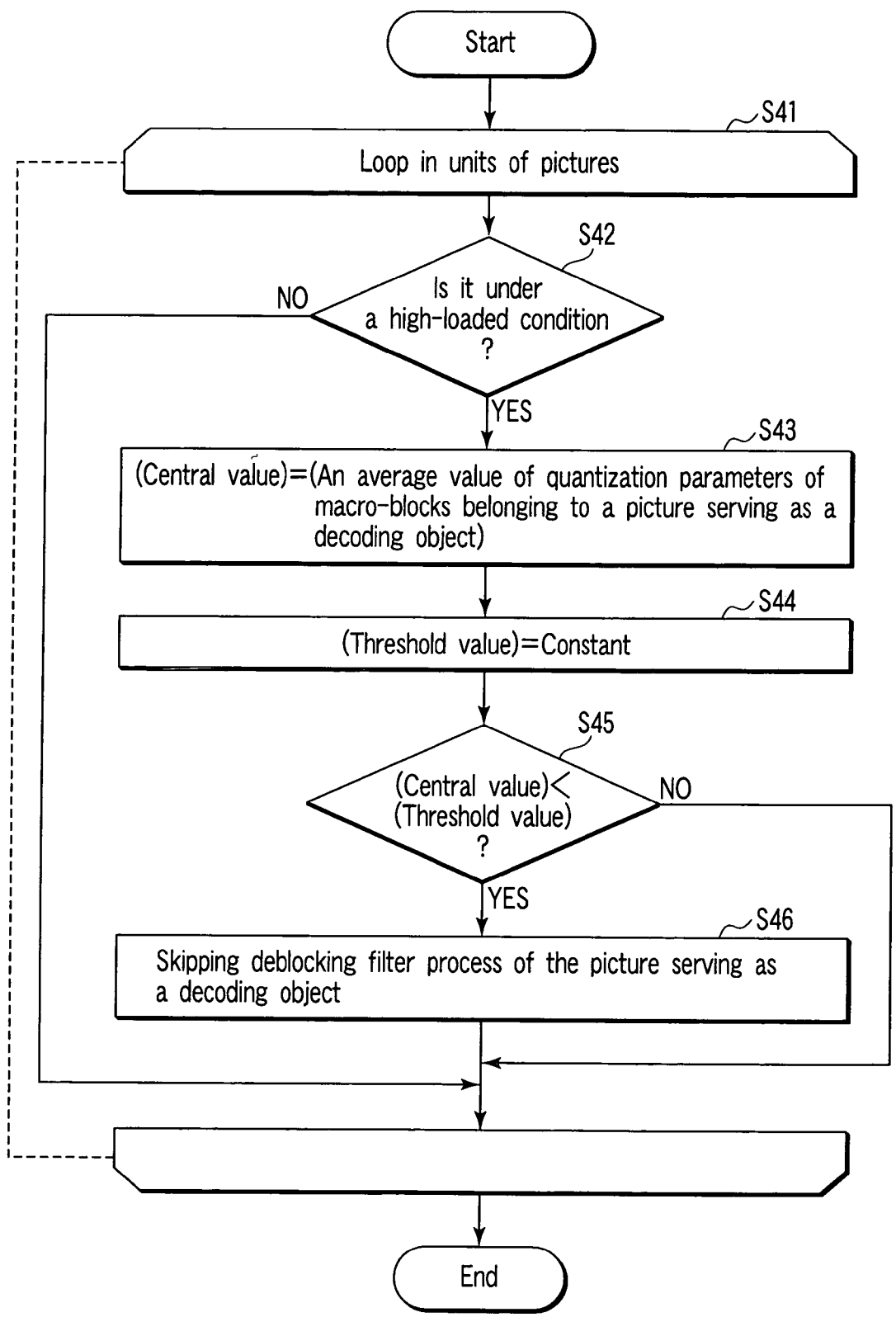
FIG. 9 is a flowchart showing a processing example in a case according to pattern 2 in skip determination by information on a quantization parameter, as a second embodiment of the skip determining method of the deblocking filter skip determining unit in FIG. 4.

FIG. 9 is a flowchart showing a processing example in a case of the pattern 2 in skip determination by information on a quantization parameter described above, as a second embodiment. In this embodiment, a skip range of filter process is set to be a loop in units of pictures (step S41). Next, it is determined whether or not the processing is under a high-loaded condition (step S42), and when the processing is under a high-loaded condition, (an average value of quantization parameters of macro-blocks belonging to a picture serving as a decoding object) is set as a central value (step S43), and a constant is set as a threshold value (step S44), and it is determined whether or not the central value is less than the threshold value (step S45). When the central value is less than the threshold value, processing is skipped deblocking filter process of the picture serving as a decoding object (step S46). When it is determined that the central value is not less than the threshold value at the step S45, the processing at step S46 is passed. Further, when it is determined that the processing is not under a high-loaded condition at the step S42, processing is carried out such that deblocking filter process is executed onto the picture serving as a decoding object.

(Third Embodiment)

Figure 10:
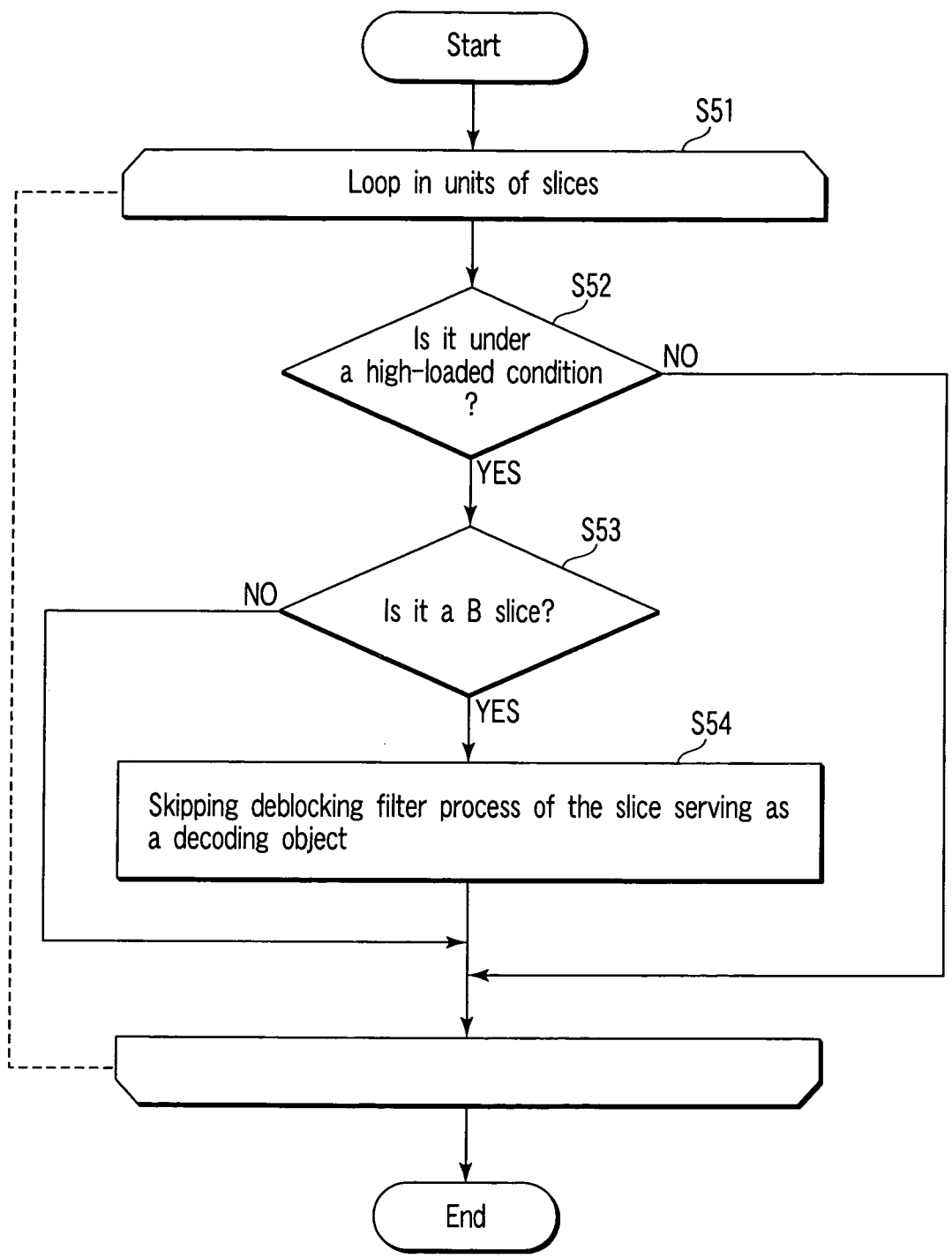
FIG. 10 is a flowchart showing a processing example in a case according to pattern 1 of a third method in skip determination by information on an encoding mode, as a third embodiment of the skip determining method of the deblocking filter skip determining unit in FIG. 4.

FIG. 10 is a flowchart showing a processing example in a case of the pattern 1 of the third method in skip determination by information on an encoding mode described above, as a third embodiment. In this embodiment, a skip range of filter process is set to be a loop in units of slices (step S51). Next, it is determined whether or not the processing is under a high-loaded condition (step S52), and when the processing is under a high-loaded condition, it is determined whether or nor an decoding object is a B slice (step S53), and when the decoding object is a B slice, processing is skipped deblocking filter process of the slice serving as a decoding object (step S54), and the routine proceeds to skip determination for the following slice unit. When it is determined that the decoding object is not a B slice at step S53, the processing at step S54 is passed. Further, when it is determined that the processing is not under a high-loaded condition at the step S52, processing is carried out such that deblocking filter process is executed onto the slice serving as a decoding object.

(Fourth Embodiment)

Figure 11:
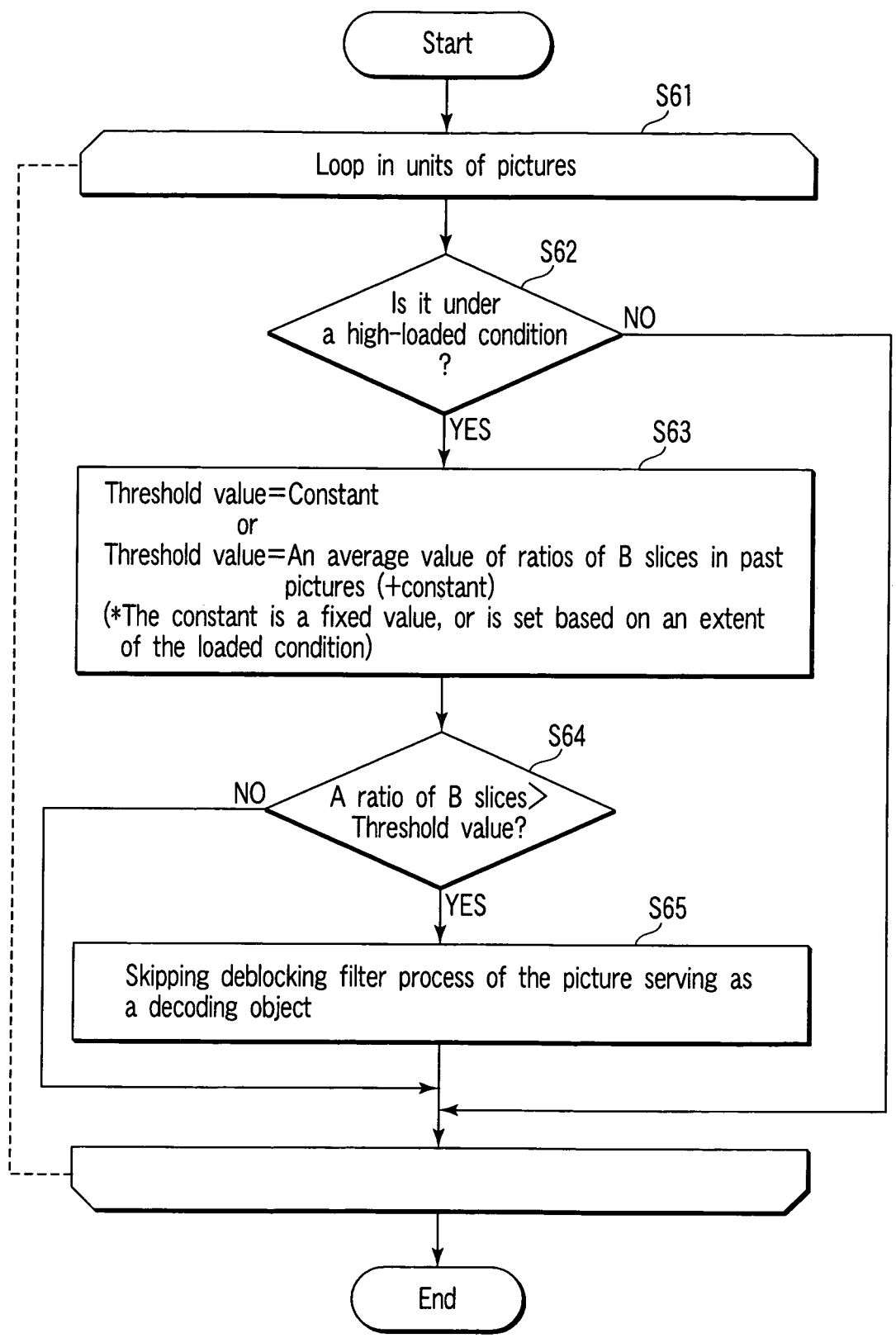
FIG. 11 is a flowchart showing a processing example in a case according to pattern 2 of the third method in skip determination by information on an encoding mode, as a fourth embodiment of the skip determining method of the deblocking filter skip determining unit in FIG. 4.

FIG. 11 is a flowchart showing a processing example in a case of the pattern 2 of the third method in skip determination by information on an encoding mode described above, as a fourth embodiment. In this embodiment, a skip range of filter process is set to be a loop in units of pictures (step S61). Next, it is determined whether or not the processing is under a high-loaded condition (step S62), and when the processing is under a high-loaded condition, a constant (which is a fixed value, or is set based on an extent of a loaded condition), or a value in which a constant is added to an average value of ratios of B slices in past (decoded) pictures is set as a threshold value (step S63), and it is determined whether or not a ratio of B slices in a picture serving as a decoding object is larger than a threshold value (step S64). When a ratio of B slices is larger than the threshold value, processing is skipped deblocking filter process of the picture serving as a decoding object (step S65), and the routine proceeds to skip determination for the following picture unit. When it is determined that a ratio of B slices is not larger than the threshold value at step S64, the processing at step S65 is passed. Further, when it is determined that the processing is not under a high-loaded condition at the step S62, processing is carried out such that deblocking filter process is executed onto the picture serving as a decoding object.

(Fifth Embodiment)

Figure 12:
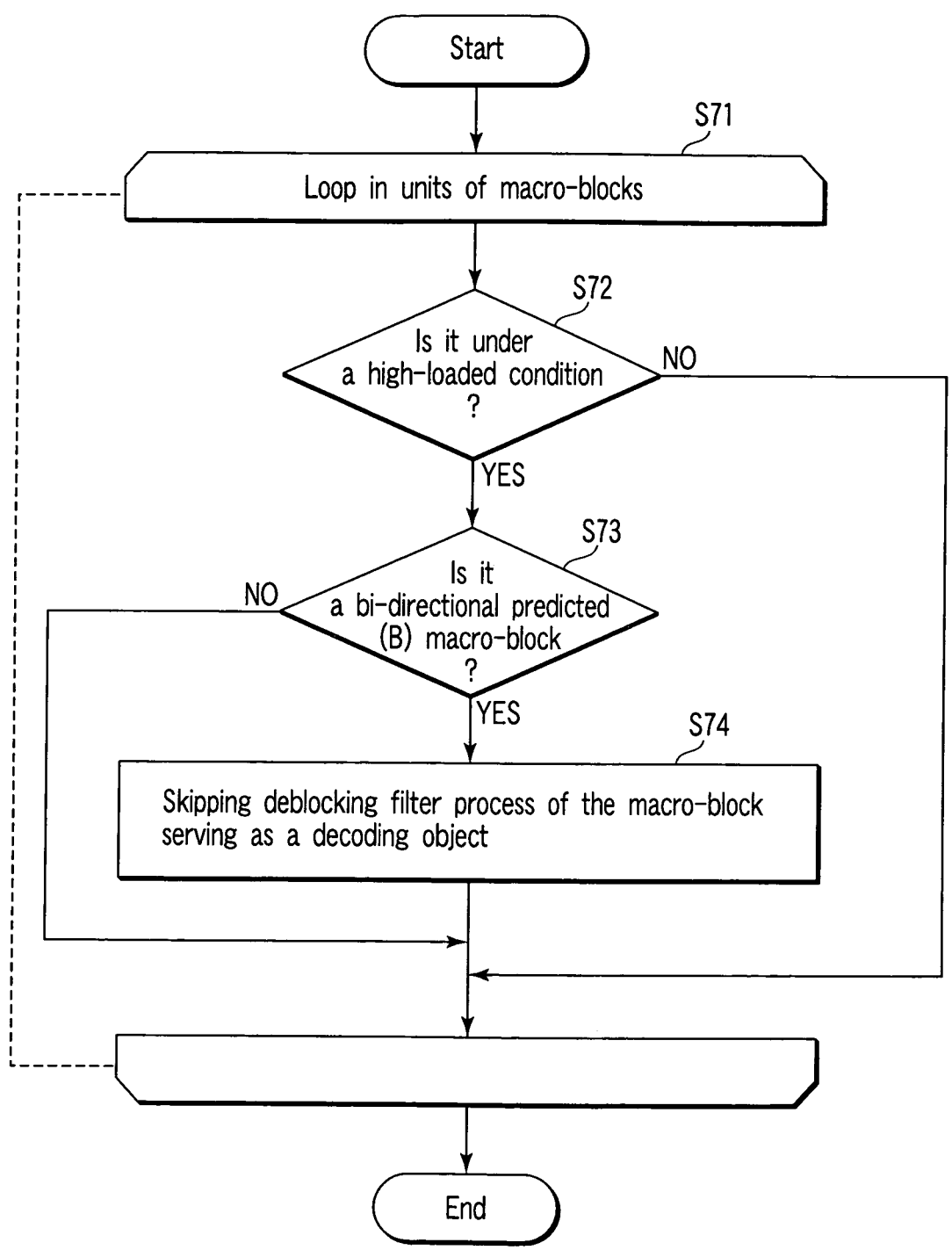
FIG. 12 is a flowchart showing a processing example in a case according to pattern 1 of a fourth method in skip determination by information on an encoding mode, as a fifth embodiment of the skip determining method of the deblocking filter skip determining unit in FIG. 4.

FIG. 12 is a flowchart showing a processing example in a case of the pattern 1 of the fourth method in skip determination by information on an encoding mode described above, as a fifth embodiment. In this embodiment, a skip range of filter process is set to be a loop in units of macro-blocks (step S71). Next, it is determined whether or not the processing is under a high-loaded condition (step S72), and when the processing is under a high-loaded condition, it is determined whether or not a decoding object is a bi-directional predicted (B) macro-block (step S73). When the decoding object is a bi-directional predicted (B) macro-block, processing is skipped deblocking filter process of the macro-block serving as a decoding object (step S74), and the routine proceeds to skip determination for the following macro-block unit. When it is determined that the decoding object is not a bi-directional predicted (B) macro-block at step S73, the processing at step S74 is passed. Further, when it is determined that the processing is not under a high-loaded condition at the step S72, processing is carried out such that deblocking filter process is executed onto the macro-block serving as a decoding object.

(Sixth Embodiment)

Figure 13:
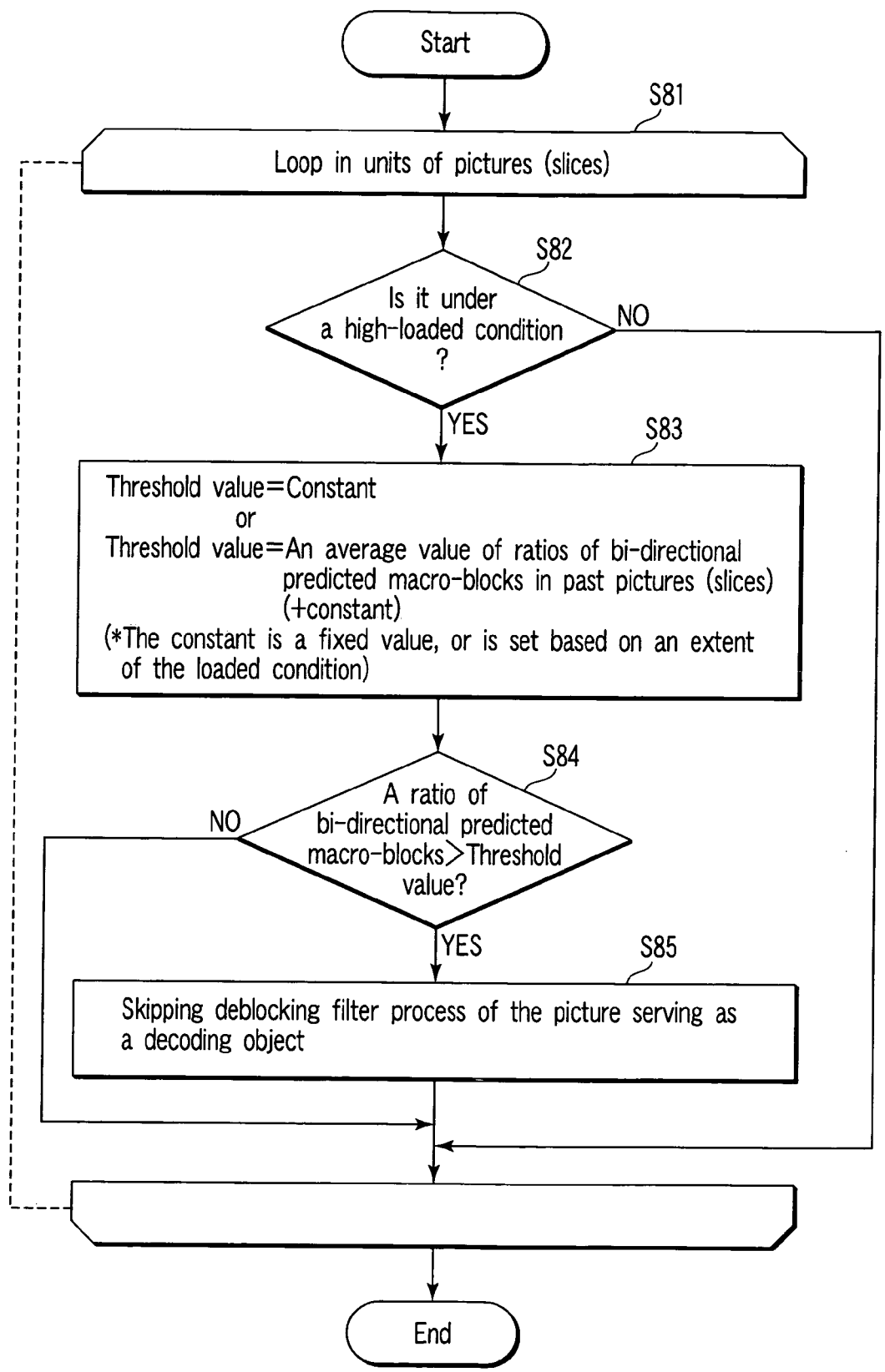
FIG. 13 is a flowchart showing a processing example in a case according to pattern 2 (or 3) of the fourth method in skip determination by information on an encoding mode, as a sixth embodiment of the skip determining method of the deblocking filter skip determining unit in FIG. 4.

FIG. 13 is a flowchart showing a processing example in a case of the pattern 2 (or 3) of the fourth method in skip determination by information on an encoding mode described above, as a sixth embodiment. In this embodiment, a skip range of filter process is set to be a loop in units of pictures (or slices) (step S81). Next, it is determined whether or not the processing is under a high-loaded condition (step S82), and when the processing is under a high-loaded condition, a constant (which is a fixed value, or is set based on an extent of a loaded condition), or a value in which a constant is added to an average value of ratios of B slices in past (decoded) pictures (or slices) is set as a threshold value (step S83), and it is determined whether or not a ratio of B slices in a picture (or a slice) serving as a decoding object is larger than a threshold value (step S84). When a ratio of B slices is larger than the threshold value, processing is skipped deblocking filter process of the picture (or the slice) serving as a decoding object (step S85), and the routine proceeds to skip determination for the following picture (or slice) unit. When it is determined that a ratio of B slices is not larger than the threshold value at step S84, the processing at step S85 is passed. Further, when it is determined that the processing is not under a high-loaded condition at the step S82, processing is carried out such that deblocking filter process is executed onto the picture (or the slice) serving as a decoding object.

(Seventh Embodiment)

Figure 14:
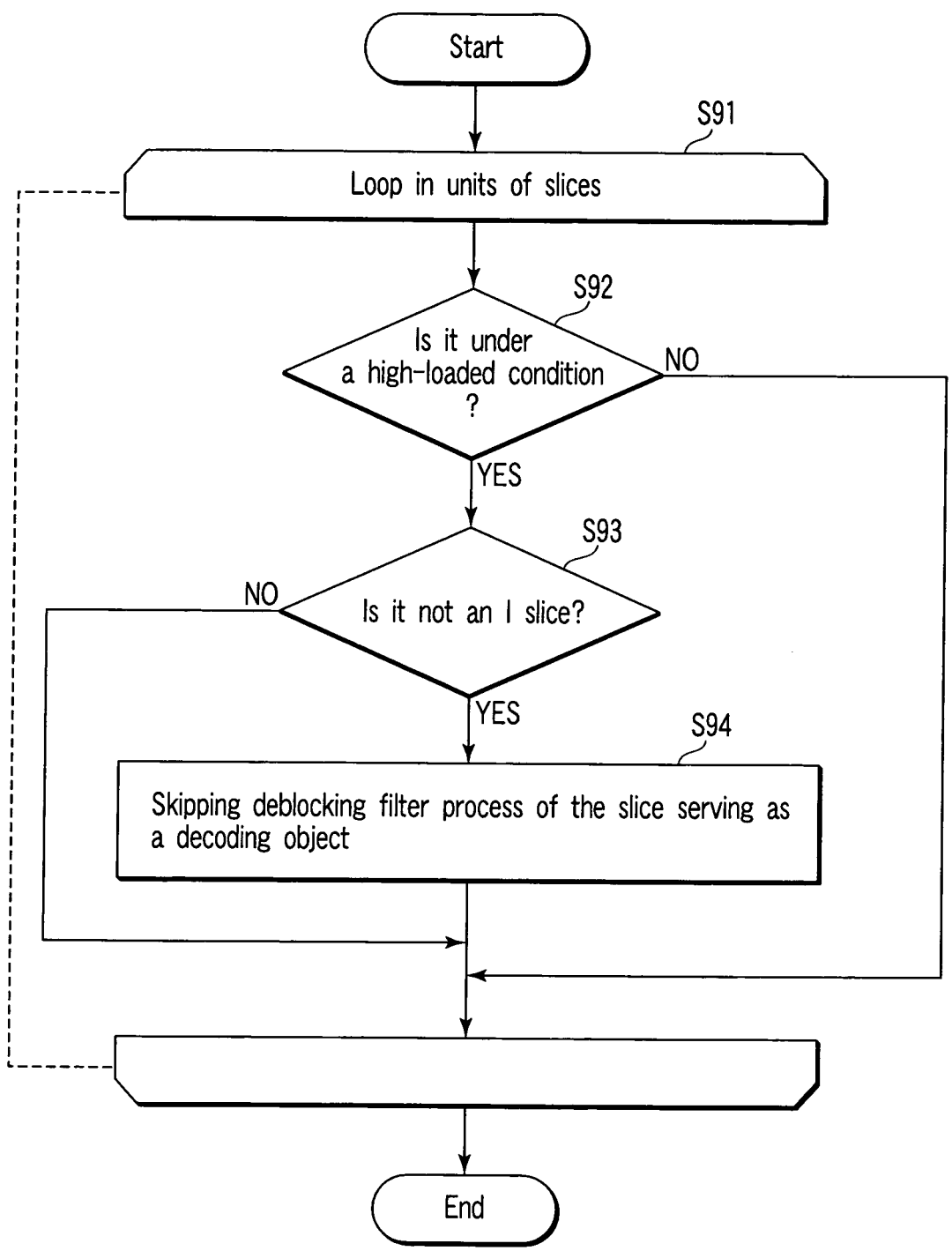
FIG. 14 is a flowchart showing a processing example in a case according to pattern 1 of a first method in skip determination by information on an encoding mode, as a seventh embodiment of the skip determining method of the deblocking filter skip determining unit in FIG. 4.

FIG. 14 is a flowchart showing a processing example in a case of the pattern 1 of the first method in skip determination by information on an encoding mode described above, as a seventh embodiment. In this embodiment, a skip range of filter process is set to be a loop in units of slices (step S91). Next, it is determined whether or not the processing is under a high-loaded condition (step S92), and when the processing is under a high-loaded condition, it is determined whether or nor an decoding object is an I slice (step S93). When it is determined that the decoding object is not an I slice, processing is skipped deblocking filter process of the slice serving as a decoding object (step S94), and the routine proceeds to skip determination for the following slice unit. When it is determined that the decoding object is an I slice at step S93, the processing at step S94 is passed. Further, when it is determined that the processing is not under a high-loaded condition at the step S92, processing is carried out such that deblocking filter process is executed onto the slice serving as a decoding object.

(Eighth Embodiment)

FIG. 15 is a flowchart showing a processing example in a case of the pattern 2 of the first method in skip determination by information on an encoding mode described above, as an eighth embodiment. In this embodiment, a skip range of filter process is set to be a loop in units of pictures (step S101). Next, it is determined whether or not the processing is under a high-loaded condition (step S102), and when the processing is under a high-loaded condition, a constant (which is a fixed value, or is set based on an extent of a loaded condition), or a value in which a constant is added to an average value of ratios of I slices in past (decoded) pictures is set as a threshold value (step S103), and it is determined whether or not a ratio of I slices in a picture serving as a decoding object is less than the threshold value (step S104). When a ratio of I slices is less than the threshold value, processing is skipped deblocking filter process of the picture serving as a decoding object (step S105), and the routine proceeds to skip determination for the following picture unit. When it is determined that a ratio of I slices is not less than the threshold value at step S104, the processing at step S105 is passed. Further, when it is determined that the processing is not under a high-loaded condition at the step S102, processing is carried out such that deblocking filter process is executed onto the picture serving as a decoding object.

(Ninth Embodiment)

FIG. 16 is a flowchart showing a processing example in a case of the pattern 1 of the second method in skip determination by information on an encoding mode described above, as a ninth embodiment. In this embodiment, a skip range of filter process is set to be a loop in units of macro-blocks (step S111). Next, it is determined whether or not the processing is under a high-loaded condition (step S112), and when the processing is under a high-loaded condition, it is determined whether or not a decoding object is an intra-predicted macro-block (step S113). When it is determined that the decoding object is not an intra-predicted macro-block, processing is skipped deblocking filter process of the macro-block serving as a decoding object (step S114), and the routine proceeds to skip determination for the following macro-block unit. When it is determined that the decoding object is an intra-predicted macro-block at step S113, the processing at step S114 is passed. Further, when it is determined that the processing is not under a high-loaded condition at the step S112, processing is carried out such that deblocking filter process is executed onto the macro-block serving as a decoding object.

(Tenth Embodiment)

Figure 17:
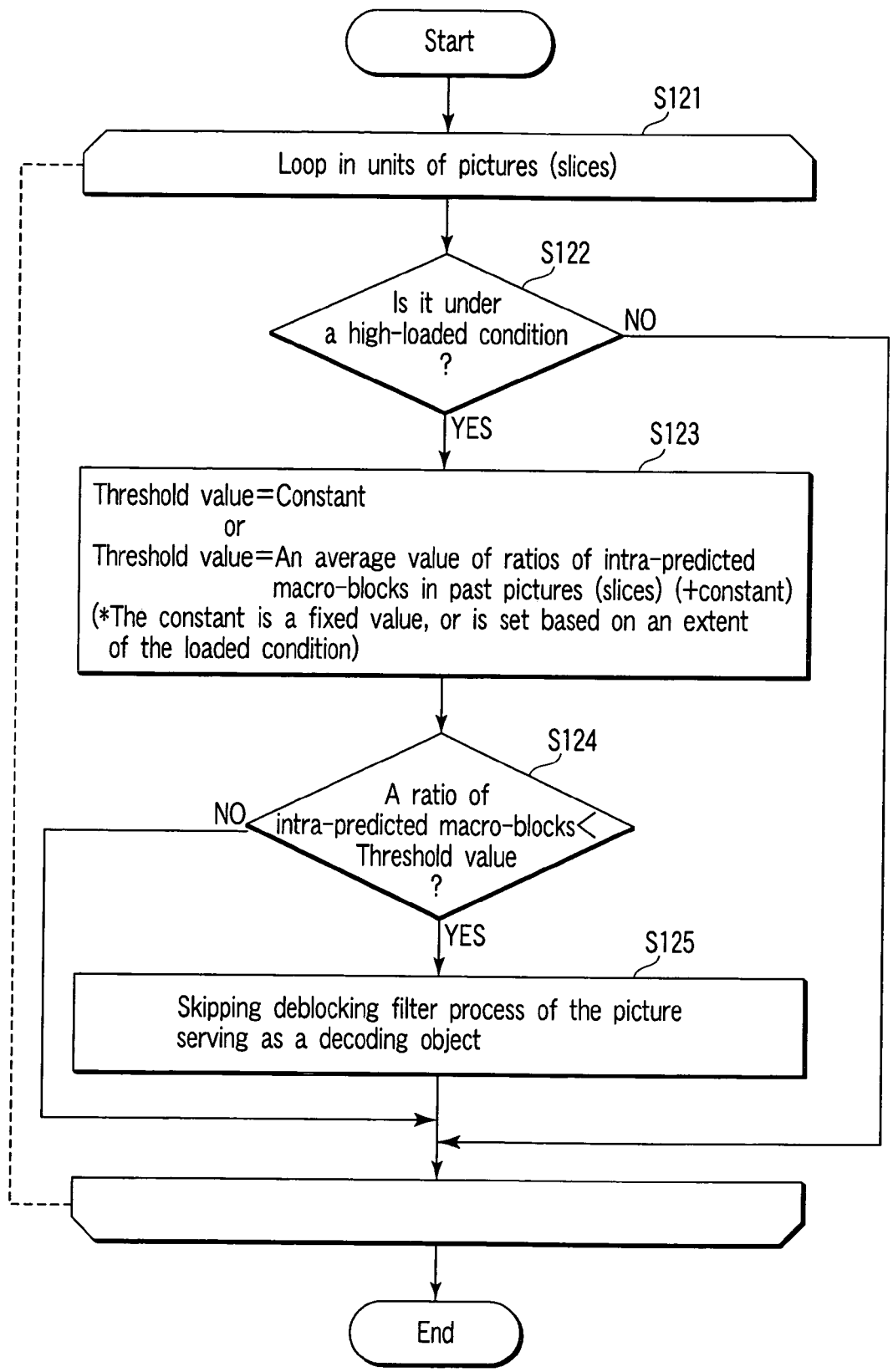
FIG. 17 is a flowchart showing a processing example in a case according to pattern 3 (or 2) of the second method in skip determination by information on an encoding mode, as a tenth embodiment of the skip determining method of the deblocking filter skip determining unit in FIG. 4.

FIG. 17 is a flowchart showing a processing example in a case of the pattern 3 (or 2) of the second method in skip determination by information on an encoding mode described above, as a tenth embodiment. In this embodiment, a skip range of filter process is set to be a loop in units of pictures (or slices) (step S121). Next, it is determined whether or not the processing is under a high-loaded condition (step S122), and when the processing is under a high-loaded condition, a constant (which is a fixed value, or is set based on an extent of a loaded condition), or a value in which a constant is added to an average value of ratios of intra-predicted macro-blocks in past (decoded) pictures (or slices) is set as a threshold value (step S123), and it is determined whether or not a ratio of intra-predicted macro-blocks in a picture (or a slice) serving as a decoding object is less than the threshold value (step S124). When a ratio of intra-predicted macro-blocks is less than the threshold value, processing is skipped deblocking filter process of the picture (or the slice) serving as a decoding object (step S125), and the routine proceeds to skip determination for the following picture (or slice) unit. When it is determined that a ratio of intra-predicted macro-blocks is not less than the threshold value at step S124, the processing at step S125 is passed. Further, when it is determined that the processing is not under a high-loaded condition at the step S122, processing is carried out such that deblocking filter process is executed onto the picture (or the slice) serving as a decoding object.

The first to tenth embodiments have been described above. However, the other patterns described above as well can be executed in the same way. Further, more efficient skip can be executed by combining individual patterns of skip determination by information respectively on a quantization parameter and an encoding mode.

Note that the present invention can be achieved as, not only a video decoding apparatus as described above, but also a video decoding method having characteristic steps which are included in such a video decoding method. Further, those steps can be realized as a program to be executed by a computer. Then, such a program can be distributed via recording media such as CD-ROMs and the like, and a transmission medium such as the Internet and the like.

While certain embodiments of the inventions have been described, these embodiments have been presented by way of example only, and are not intended to limit the scope of the inventions. Indeed, the novel methods and systems described herein may be embodied in a variety of forms; furthermore, various skips, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus which decodes a compressed and encoded video stream, comprising:
    means for selectively generating one of an intra prediction image and an inter prediction image based on an encoding mode of at least one decoding object from the video stream;
    means for generating a residual error decoded image based on a quantization parameter of the decoding object from the video stream;
    means for generating a decoded image by adding
        (1) the selected one of the intra prediction image and the inter prediction image and
        (2) the residual error decoded image generated by the means for generating the residual error decoding image;
    means for applying a deblocking filter process for reducing a block distortion onto the decoded image generated by the residual error adding means;
    means for extracting information, the information being at least one of
        (i) information on a quantization parameter and
        (ii) information on the encoding mode of the decoding object from the video stream;
    means for determining whether or not the filter process is skipped based on the extracted information; and means for selectively skipping the filter process on the basis of a result provided by the means for determining;
    wherein the means for determining whether or not the filter process is skipped is based on a power supply being used by the information processing apparatus, where the filter process is performed when a commercial power supply driving is used, and the filter process is skipped based on a remaining battery level when power is supplied by a battery.

2. The information processing apparatus according to claim 1, wherein the means for further determining
    whether or not the filter process is skipped by performing a determination of skip by specifying a central value of quantization parameters of the decoding object to be compared with a threshold value serving as a reference for determination, and
    carries out the determination of skip on the basis of a comparison result thereof; and
    the threshold value is an average value of the central values of quantization parameters in decoded past pictures or slices, or a value obtained by adding an offset value to the average value.

3. The information processing apparatus according to claim 2, wherein the means for determining whether or not the filter process is skipped performs a determination of skip in units of slices, in units of macro-blocks, in units of an arbitrary number of macro-blocks, or in units of pictures of the decoded image.

4. The information processing apparatus according to claim 2, wherein the means for determining whether or not the filter process is skipped determines that the filter process is not skipped when the information on the encoding mode of the decoding object is at least a slice in a reference picture by only prediction-in-screen.

5. The information processing apparatus according to claim 2, wherein the means for determining whether or not the filter process is skipped determines that the filter process is not skipped when the information on the encoding mode of the decoding object is at least a predicted macro-block in-screen.

6. The information processing apparatus according to claim 2, wherein the means for determining whether or not the filter process is skipped determines that the filter process is skipped when the information on the encoding mode of the decoding object is at least a slice in a non-reference picture.

7. The information processing apparatus according to claim 2, wherein the means for determining whether or not the filter process is skipped determines that the filter process is skipped when the information on the encoding mode of the decoding object is at least a bidirectional predicted macro-block (a bidirectional predicted macro-block in-screen).

8. A video decoding method for decoding a compressed and encoded video stream, the method comprising:
   selectively generating one of an intra prediction image and an inter prediction image on the basis of an encoding mode of at least one decoding object from the video stream;
   generating a residual error decoded image based on a quantization parameter of a decoding object from the video stream;
   generating a decoded image by adding the one of the intra prediction image and the inter prediction image selectively generated, and the residual error decoded image;
   applying a filter process for reducing a block distortion onto the decoded image;
   extracting at least one of information on a quantization parameter and information on an encoding mode of the decoding object from the video stream;
   determining whether or not the filter process is skipped based on extracted information thereof; and
   selectively skipping the filter process based on a result of the determination:
   wherein the determining whether or not the filter process is skipped based on a power supply being used by the information processing apparatus, wherein the filter process is performed when a commercial power supply driving is used, and the filter process is skipped based on a remaining battery level when power is supplied by a battery.

9. The video decoding method according to claim 8, wherein the determining whether or not the filter process is skipped considers if power is being supplied by the battery and information on a remaining battery level.

10. The video decoding method according to claim 8, wherein the filter process is a deblocking filter process.

11. The video decoding method according to claim 8, wherein the determining whether or not the filter process is skipped further comprises performing a determination of skip by specifying a central value of quantization parameters of the decoding object to be compared with a threshold value serving as a reference for determination, and carrying out the determination of skip on the basis of a comparison result thereof, and the threshold value is an average value of the central values of quantization parameters in decoded past pictures or slices, or a value obtained by adding an offset value to the average value.

12. A non-transitory computer-readable memory containing program instructions that, when executed by a processor, perform functions for decoding a compressed and encoded video stream, comprising:
   selectively generating one of an intra prediction image and an inter prediction image on the basis of an encoding mode of at least one decoding object from the video stream;
   generating a residual error decoded image on the basis of a quantization parameter of a decoding object from the video stream;
   generating a decoded image by adding the intra prediction image and the inter prediction image selectively generated, and the residual error decoded image;
   applying deblocking filter process for reducing a block distortion onto the decoded image; and
   extracting information including at least one of information on a quantization parameter and information on an encoding mode of the decoding object from the video stream, determining whether or not the filter process is skipped on the basis of the extracted information, and selectively skipping the filter process on the basis of a result of the determination;
   wherein the determining whether or not the filter process is skipped based on a power supply being used by the information processing apparatus, wherein the deblocking filter process is performed when a commercial power supply driving is used, and the filter process is skipped based on a remaining battery level when power is supplied by a battery.

13. The non-transitory computer-readable memory according to claim 12, wherein the memory containing program instructions that, when executed by the processor, perform a determination of skip by specifying a central value of quantization parameters of the decoding object to be compared with a threshold value serving as a reference for determination, and carrying out the determination of skip on the basis of a comparison result thereof, and the threshold value is an average value of the central values of quantization parameters in decoded past pictures or slices, or a value obtained by adding an offset value to the average value.

* * * * *